United States Patent [19]

Kierzkowski et al.

[11] Patent Number: 4,854,950

[45] Date of Patent: Aug. 8, 1989

[54] MOISTURE SEPARATOR

[75] Inventors: Frank J. Kierzkowski, Bedford; John R. Ross, Duncanville, both of Tex.

[73] Assignee: Peerless Manufacturing Company, Dallas, Tex.

[21] Appl. No.: 69,710

[22] Filed: Jul. 6, 1987
(Under 37 CFR 1.47)

[51] Int. Cl.$^4$ .............................................. B01D 29/02
[52] U.S. Cl. ........................................ 55/213; 55/311; 55/312; 55/422; 55/309
[58] Field of Search ................... 55/21, 213, 309–314, 55/422, 478–481

[56] References Cited

U.S. PATENT DOCUMENTS

| | | | |
|---|---|---|---|
| 1,666,756 | 4/1922 | Sass | 210/131 |
| 1,914,667 | 6/1933 | Kolla | 55/313 |
| 2,135,750 | 11/1938 | Harding | 55/493 X |
| 2,303,333 | 2/1940 | Dauphinee | 55/312 |
| 2,575,499 | 11/1951 | Manow | 55/422 |
| 2,783,786 | 3/1957 | Carter | 55/309 X |
| 3,353,551 | 11/1967 | Smale | 55/312 X |
| 3,410,288 | 11/1968 | Hajek | 55/312 X |
| 3,411,272 | 2/1966 | Carmon | 55/274 |
| 3,421,296 | 1/1969 | Beurer, Sr. | 55/306 |
| 3,593,503 | 7/1971 | Andrews | 55/481 |
| 3,612,024 | 10/1971 | Bandimere | 55/312 X |
| 3,733,814 | 5/1973 | Hull, Jr., et al. | 55/422 X |
| 3,823,532 | 7/1974 | Cooper et al. | 55/357 |
| 3,841,259 | 10/1974 | Parkinson et al. | 116/70 |
| 3,869,266 | 3/1975 | Rannenberg | 55/309 |
| 4,081,255 | 3/1978 | Evans | 55/230 |
| 4,231,769 | 11/1980 | Ahlrich | 55/242 |
| 4,300,918 | 11/1981 | Cary | 55/1 |
| 4,312,645 | 1/1982 | Mavros et al. | 55/213 |
| 4,361,423 | 11/1982 | Nitz | 55/100 |
| 4,698,078 | 10/1987 | Mavros | 55/213 |

FOREIGN PATENT DOCUMENTS

| | | | |
|---|---|---|---|
| 0085576 | 8/1983 | European Pat. Off. | |
| 0087229 | 8/1983 | European Pat. Off. | |
| 433056 | 8/1926 | Fed. Rep. of Germany | 55/313 |
| 875287 | 4/1953 | Fed. Rep. of Germany | 55/309 |
| 8603424 | 6/1986 | PCT Int'l Appl. | |
| 8603557 | 6/1986 | PCT Int'l Appl. | |
| 2136311 | 9/1984 | United Kingdom | 55/309 |
| 2158732 | 11/1985 | United Kingdom | |
| 2182582 | 5/1987 | United Kingdom | |

OTHER PUBLICATIONS

Bath Iron Works Corporation. "Purchase Specification for DDG 51 Program Moisture Separator/Blow-In Panel Sets". Apr. 30, 1986.

*Primary Examiner*—Robert Spitzer
*Attorney, Agent, or Firm*—Richards, Harris, Medlock & Andrews

[57] ABSTRACT

A moisture separator (10, 150, 200) is provided for filtering air being provided to a marine power plant. If the moisture separator becomes clogged, reducing air flow, a vacuum sensing switch (108) is closed to power panels (18, 20) to an opened position, permitting air to bypass the filtering elements of the moisture separator and flow directly to the power plant. The doors can be powered shut and latched in either position. A de-icing manifold (206) serves a dual function of spraying a de-icing fluid on the panels and also acts as a frame for the latching mechanism to hold a panel in an open position.

7 Claims, 21 Drawing Sheets

FIG. 26 flow ⇨

MOISTURE SEPARATOR

TECHNICAL FIELD

This invention relates to a moisture separator for air flow into a marine turbine power plant with air bypass capability.

BACKGROUND OF THE INVENTION

A marine turbine power plant must be provided with large volumes of relatively pure air to operate efficiently and reliably. Typically, air to supply the turbine engine is drawn from intakes on the upper superstructure of the ship to minimize entry of water spray. Further, the air is normally passed through a moisture separator which filters water and other contaminants out of the air flow.

Moisture separators will occasionally become clogged sufficiently to impair the supply of air to the engine. In most applications, this requires the engine to be shut down and the separator cleaned. However, in certain situations, particularly on warships in a combat situation, it may be desirable to bypass the clogged moisture separator to keep the engine running. In a combat situation, the damage done by the entry of dirty bypass air to the engine is far outweighed by the need to keep the engine operational in the short term.

In the past, various designs have been developed for a moisture separator which normally will be positioned in the air flow path, but which can be blown open under certain circumstances to allow air to bypass the moisture separator. An example of such a design is found in U.S. Pat. No. 4,312,645 issued Jan. 26, 1982 and assigned on its face to the Parmatic Engineering Company. In a different area, U.S. Pat. No. 3,411,272 to Carmon discloses an air filter for use in a helicopter turbine. However, a need still exists for the development of a design that increases efficiency, reliability and maximizes cost effectiveness.

SUMMARY OF THE INVENTION

In accordance with one aspect of the present invention, an apparatus is provided for filtering air entering a flow passage. The apparatus includes a frame surrounding an opening into the flow passage and a panel mounted to the frame for pivotal motion between a closed position and an open position. The panel includes means for filtering air passing through the panel. Air entering the flow passage passes through the panel when the panel is in the closed position. Air is permitted to bypass the panel when the panel is in the opened position. Structure is provided for powering the panel from the closed to the opened position. Structure is also provided for powering the panel from the open position to the closed position.

In accordance with another aspect of the present invention, a first latching structure is provided to latch the panel in the closed position. A second latching structure is provided to latch the panel in the open position.

In accordance with yet another aspect of the present invention, the panel is mounted to pivot into the air flow when moving from the closed to the opened position. A portion of the frame extends in the direction of flow to provide a mount for the second latching structure to hold the panel in the opened position. The portion can also act as a spray apparatus for spraying fluid on the panel to clean the filter structure in the panel.

BRIEF DESCRIPTION OF THE DRAWINGS

For a more complete understanding of the present invention and the advantages thereof, reference is now made to the following description taken in conjunction with the accompanying drawings, in which.

DETAILED DESCRIPTION

With reference now to FIGS. 1-16, a first embodiment of the present invention is illustrated which forms a moisture separator 10. Moisture separator 10 is specifically designed for use in an engine air inlet system for a marine turbine engine. However, it will be understood that the moisture separator 10 can be used to filter air for any power source, including turbine and diesel propulsion and generating plants for both combustion and cooling air. The moisture separator 10 illustrated is provided with a frame 12 which supports four panels 14, 16, 18 and 20. The lower panels 14 and 16 are fixed. The upper panels 18 and 20 are mounted to the frame 12 by hinges which permit the panels to pivot 15 about an axis 22 between open and closed positions. The moisture separator 10 is mounted to the superstructure of a ship over the air inlet passage to the turbine power plant. With the panels 18 and 20 in the closed position, all air entering the inlet passage must pass through the panels. When the panels 18 and 20 are pivoted to the open position, air can pass through the frame 12 and around the panels 18 and 20 to bypass the panels.

Each of the panels is provided with a filter or agglomerator 24 and a vane pack 26. The filter 24 contains a lightweight frame containing agglomerator media 28 for filtering water and other contaminants from air flowing through the filter. The filter 24 is secured on the panel by four quick release plungers 30 which permit quick removal of the filter for cleaning or replacement. The agglomerator media can be formed by 100% synthetic polyester fibers bonded together with a special combination of heat resistant and flame retardant chemical bonding agents. Alternatively, a combination of synthetic and metallic filtering materials can be used. The filter is typically about 2" thick, able to withstand temperatures up to 400° F. and has a resiliency of 90% recovery after compression. The vane pack 26 is an array of impingement vane elements 32. Elements 32 have a labyrinth cross section which separates the heavier water or debris particles from the air. The water and debris then falls down through the vane structure by gravity to waste drains provided in the moisture separator. A continuous seal 21, preferably of closed cell silicone foam, seals between the perimeter of the panels and the frame when the panels are closed.

Figure 1:
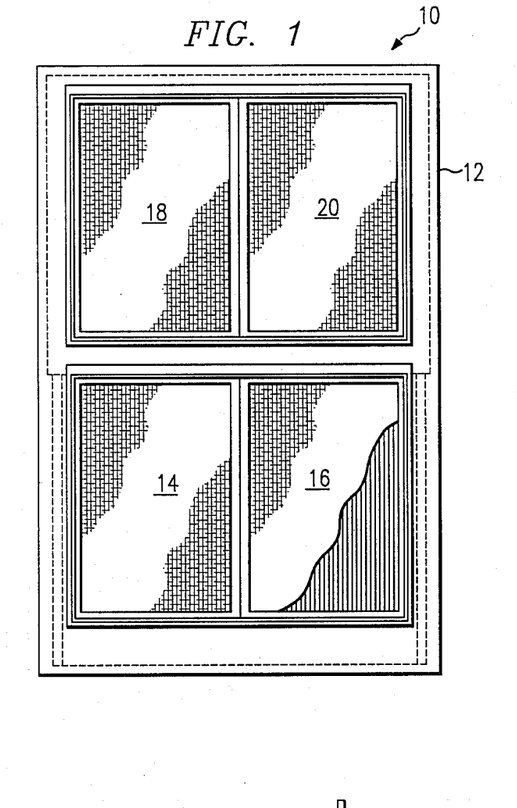
FIG. 1 is an inlet elevation view of a moisture separator forming a first embodiment of the present invention.
Figure 2:
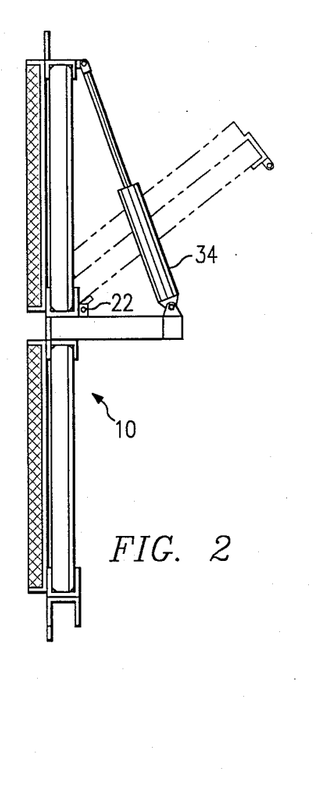
FIG. 2 is a side view in partial cross-section of the moisture separator of FIG. 1.
Figure 3:
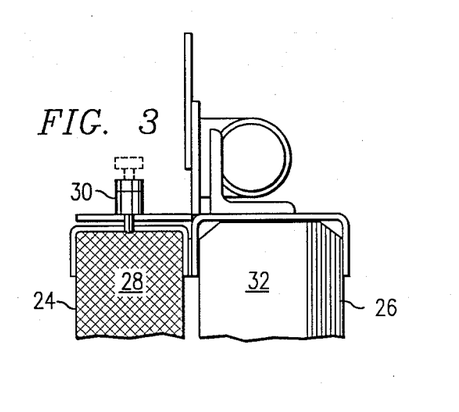
FIG. 3 is a detailed view of the latch mechanism holding the panel in the closed position.
Figure 4:
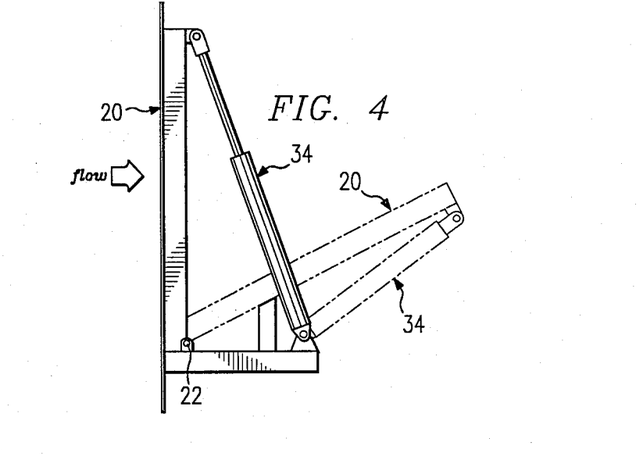
FIG. 4 is a side view of the mechanism for opening and closing the panel.
Figure 5:
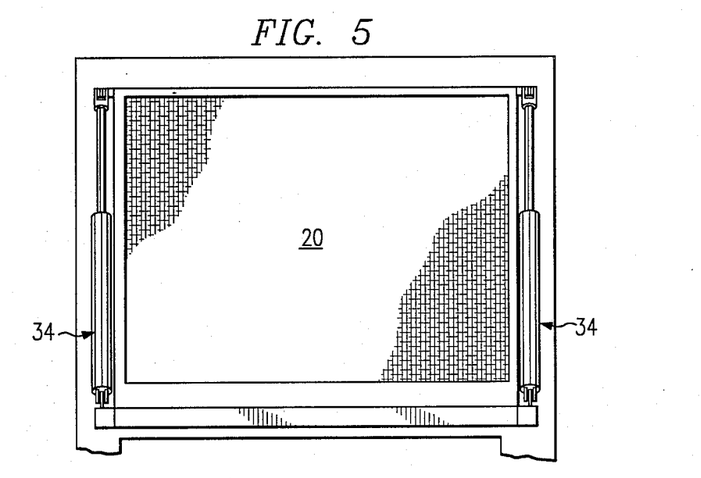
FIG. 5 is an outlet elevation of one blow-in panel of the moisture separator.
Figure 6:
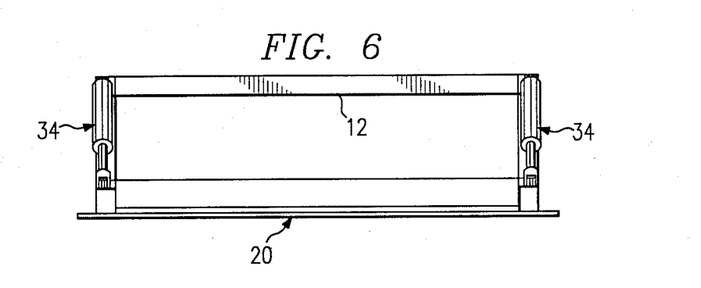
FIG. 6 is a top view of the blow-in panel of the moisture separator.

The panels 18 and 20 will normally be in the closed position to filter air passing therethrough. However, if the panels 14-20 become clogged, for example by debris or frozen spray, insufficient air may be passing through the moisture separator to supply the power plant. This depravation condition is indicated by a pressure drop downstream of the moisture separator as the power plant attempts to draw sufficient air to operate. This drop in pressure is sensed by control circuitry described hereinafter to provide pressurized air to a pair of double-acting air cylinders 34 attached between the frame 12 and each side of panels 18 and 20, 25 as best seen in FIG. 4. A latch mechanism 36 (FIGS. 7-9) normally latches each panel 18 and 20 in the closed position. The latch is first deactivated, immediately thereafter the air cylinders 34 are activated to permit the panels 18 and 20 to be powered to the open position by air cylinders 34 where the panels abut a pair of lower stops 38 (at an angle sufficient to allow enough air to by-pass the filters to keep the engines operational, in one design about 60° to vertical). A latch mechanism 40, as best seen in FIG. 10, is employed to hold each panel in the opened position. When the engine air demand is reduced, or the filters cleaned, the latch mechanism 40 is deactivated and air cylinders 34 are driven to power the panels 18 and 20 back to the closed position where they again are latched in the closed position by latch mechanism 36.

Figure 7:
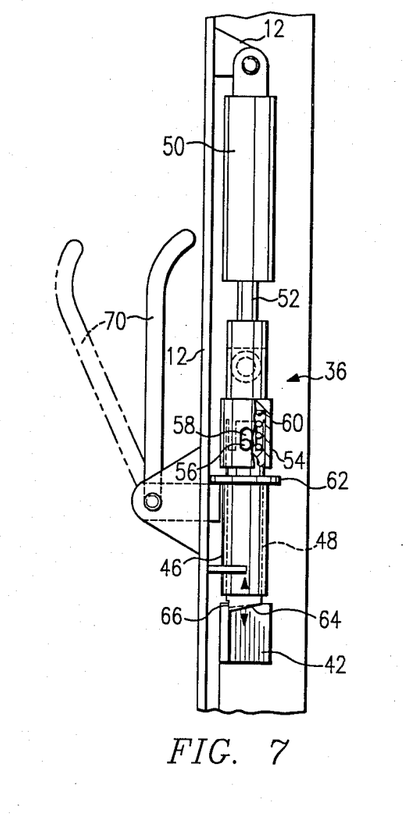
FIG. 7 is a top view of the latch mechanism to hold the blow-in panel in the closed position.
Figure 8:
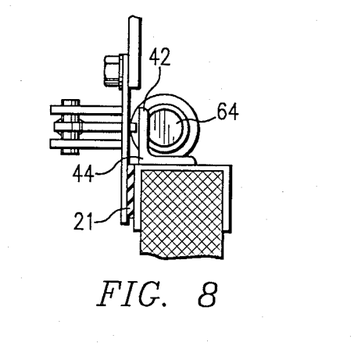
FIG. 8 is a side view of the latch mechanism of FIG. 7.
Figure 9:
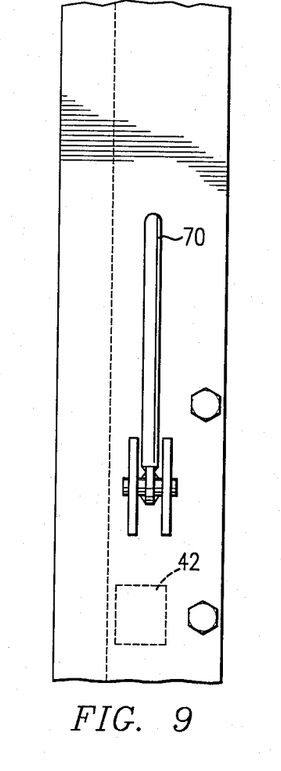
FIG. 9 is a front view of the latch mechanism of FIG. 7.
Figure 10:
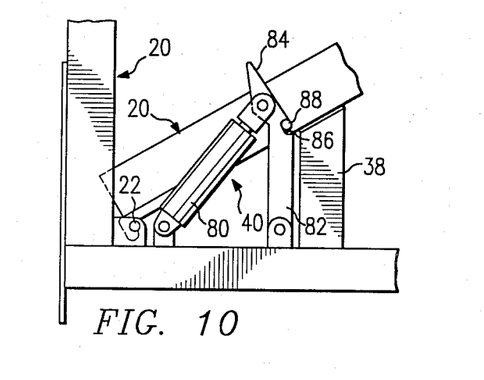
FIG. 10 is a side view of the latch mechanism to hold the blow-in panel in the opened position.

With reference now to FIGS. 7-9, the structure of latch mechanism 36 will be described in further detail. Catch 42 is mounted on the blow-in panel and includes an edge 44. A guide 46 is rigidly welded to the frame 12 and receives a cylindrical plunger 48 which is slidable in the direction of the arrows illustrated in FIG. 7. The base of an air cylinder 50 is pivoted to the frame while its piston 52 is pivoted to a manual override assembly 54. One end of the plunger is received within the assembly 54 for limited motion relative thereto in the direction of the arrows as well. The end of the plunger has a pin 56 which rides in a slot 58 in assembly 54 to limit the relative movement of plunger 48 and assembly 54. A spring 60 acts between plunger 48 and assembly 54 to urge pin 56 against the end of slot 58 as illustrated in FIG. 7. Within air cylinder 50 is a spring which forces the piston 52 to extend in the absence of air pressure. In the extended position, the piston forces assembly 54 and plunger 48 to the left as seen in FIG. 7. A collar 62 on plunger 48 limits the motion of the plunger in that direction. The end of plunger 48 opposite the assembly 54 has a ramp 64 and a notch 66. Notch 66 contacts the underside of catch 42 to hold the panel in the closed position. To release latch mechanism 40, air pressure is provided to cylinder 50 to retract the piston 52 against the force of the spring within the cylinder. This causes plunger 48 to withdraw from contact with catch 42 and allows the panel to move from the closed position. A manual open lever 70 can be pivoted to the frame as shown to override the operation of cylinder 50 by contacting collar 62 and moving plunger 48 relative to assembly 54 by compressing spring 60 to release the catch. Such a manual release can be used should cylinder 50 become frozen. The latch 36 will operate automatically as the panel moves to the closed position as the plunger will deflect through contacts between edge 44 and ramp 64 until notch 66 catches against the underside of the catch.

With reference now to FIG. 10, the components of the latch mechanism 40 will be described. The base of a single acting air cylinder 80 is pivoted to the frame proximate the lower stop 38. A catch 82 is also pivoted to the frame at one end, and to the piston of cylinder 80 at its opposite end. The catch 82 is formed with a ramp surface 84 and a notch 86 to cooperate with a locking pin 88 on the side of the blow-in panel. An internal spring within the cylinder 80 urges the piston of the cylinder to move to the extended position. As the blow-in panel is pivoted to the opened position, the pin 88 contacts ramp surface 84 to pivot the catch in the counter-clockwise direction as seen in FIG. 10 until the pin is received in notch 86 where the force of the spring within air cylinder 80 locks the panel in the opened position against the lower stop 38. If pressurized air is provided to cylinder 80 to retract the piston, the catch will pivot in the counter-clockwise direction away from the pin, releasing the pin and permitting the panel to be pivoted toward the closed position. Mechanism 40 can be released manually as well.

Figure 11:
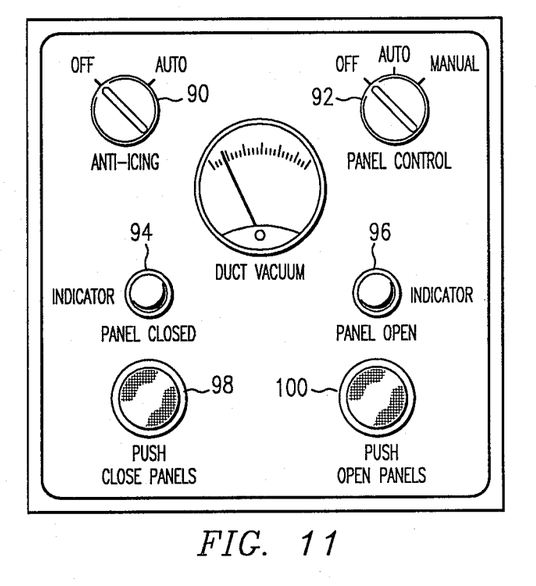
FIG. 11 is an illustrative view of the control panel of the moisture separator.
Figure 12:
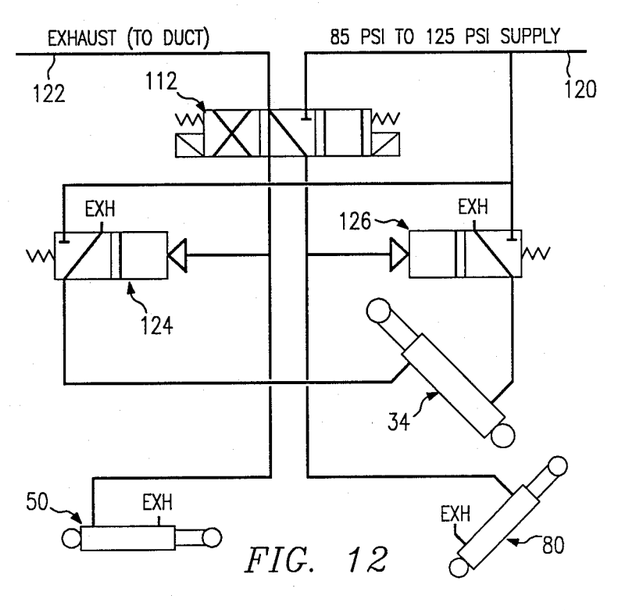
FIG. 12 is the circuit diagram for pneumatic operation of the moisture separator.
Figure 13:
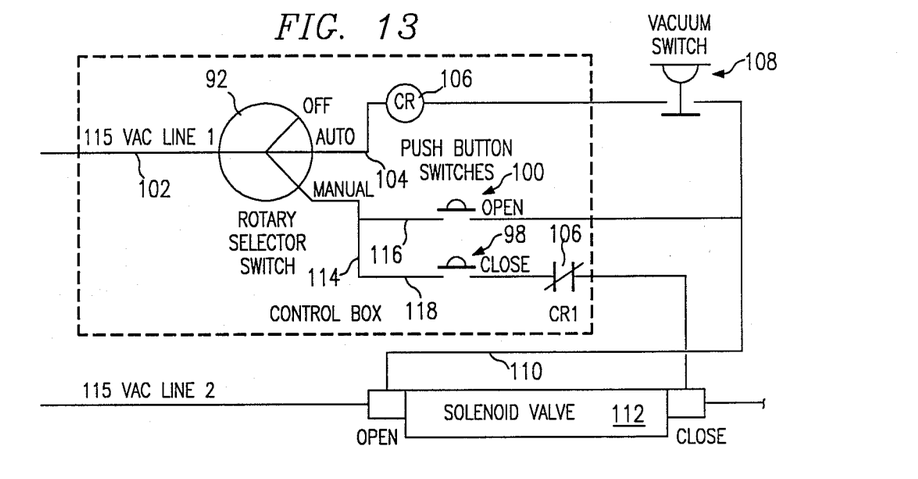
FIG. 13 is a schematic of the panel set actuation circuit for the moisture separator.

With reference now to FIGS. 11-13, the operating circuits of the moisture separator will be described. The control panel illustrated in FIG. 11 illustrates a switch 90 for activating the anti-icing circuit of the moisture separator and a switch 92 for selecting manual or automatic operation of the blow-in panels, or deactivating the system. An indicator light 94 is lit when the blow-in panels are closed. An indicator light 96 is illuminated when the blow-in panels are opened. A push button 98 can be operated in certain circumstances to close the blow-in panels. A push button 100 can be operated to open the blow-in panels.

With reference to FIG. 13, power is provided to switch 92 through line 102. In automatic mode, line 102 is connected to line 104 which opens normally closed core relay (CR) 106. A vacuum sensing switch 108 is provided in line 104. Switch 108 senses the vacuum downstream of the moisture separator and will close when the pressure drops to a level indicating excessive blockage in the moisture separator. When switch 108 closes, line 102 is connected to line 110 to operate a solenoid valve 112 to open the blow-in doors as will be described hereinafter.

In the manual mode, power line 102 is connected to line 114. Line 114 splits into lines 116 and 118. Line 116 connects with line 110 through push button switch 100. Closing of switch 100 will also activate the solenoid valve to open the blow-in doors. Line 118 connects to the solenoid valve 112 to close the blow-in doors through push button switch 98 and the contacts of relay 106. If power is provided to line 104 when operation is in the automatic mode, the contacts in relay 106 will open, preventing closure of the blow-in doors by pushing switch 98.

With reference now to FIG. 12 the pneumatic operation of the blow-in panels will be described. High pressure air (or pure Nitrogen to reduce the risk of water vapor in the air freezing and jamming the cylinders and valves) is provided through a line 120, preferably at a pressure of 85–125 psi. Line 122 forms an exhaust line. In the neutral position of solenoid valve 112, the line 120 is blocked and latching cylinders 50 and 80 are exhausted to the atmosphere. When solenoid valve 112 moves to the open position, line 120 is connected to cylinder 50 to unlatch mechanism 36 and to a relay valve 124. A 75 psi spring holds the relay valve closed while the cylinder 50 unlatches mechanism 36. When the piston of cylinder 50 is retracted and mechanism 36 unlatched, pressure builds up in the supply line sufficiently to overcome the 75 psi bias on valve 124, activating valve 124 to connect line 120 to cylinders 34 to move the blow-in doors from the closed position to the opened position. After the blow-in panels have moved to the open position, air will pass around the panels in an unrestricted flow which should deactivate the vacuum sensing switch 108. When switch 108 is deactivated, the solenoid valve 112 returns to the neutral position and the panels are held in the open position solely by latch mechanism 40.

The panel can be closed either manually or by pushing the close push button 98. By pushing button 98, solenoid valve 112 is activated to connect line 120 to cylinder 80 to unlatch the panels and to relay valve 126. Again, cylinder 80 is operated to unlatch the panel before the 75 psi bias force on valve 126 is overcome to connect the supply line 120 to the opposite chamber of cylinders 34 to power the panels from the opened position to the closed position where they are latched in the closed position by latching mechanism 36.

Figure 14:
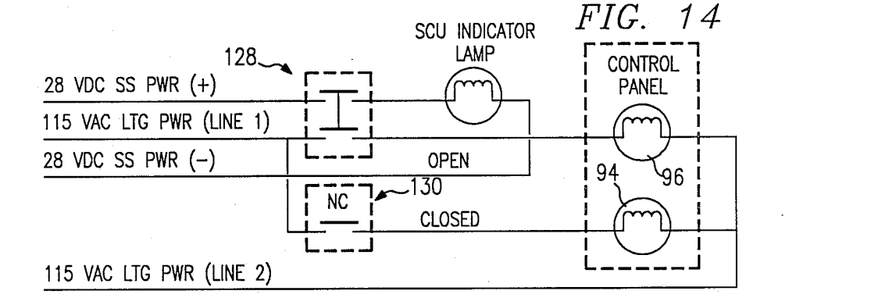
FIG. 14 is a schematic of the indication circuit for propulsion of the moisture separator.
Figure 15:
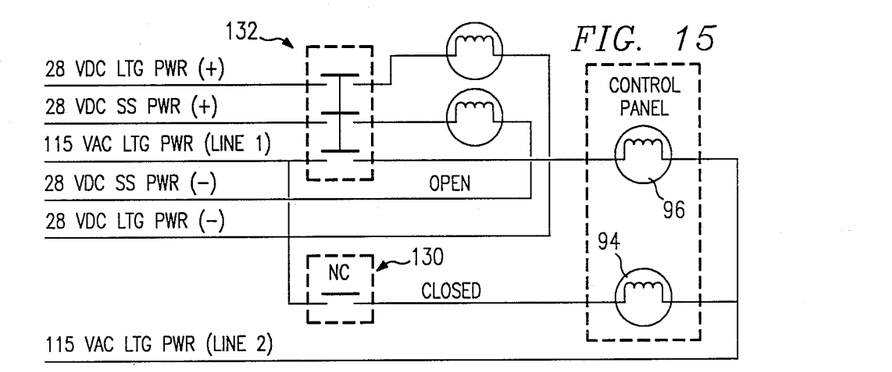
FIG. 15 is a schematic of the indication circuit for ship service for the moisture separator.

FIGS. 14 and 15 illustrate the power circuits for the indicator lights 94 and 96 in the control panel and other lights, as required. Proximity switches 128, 130 and 132 sense the open and closed positions of the blow-in panels to provide power to respective lights.

Figure 16:
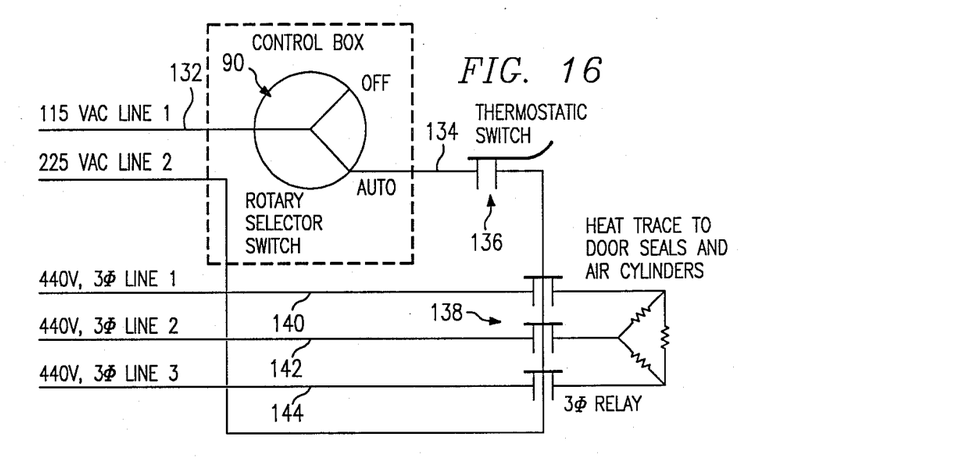
FIG. 16 is a schematic of the anti-icing circuit for the moisture separator.
Figure 17:
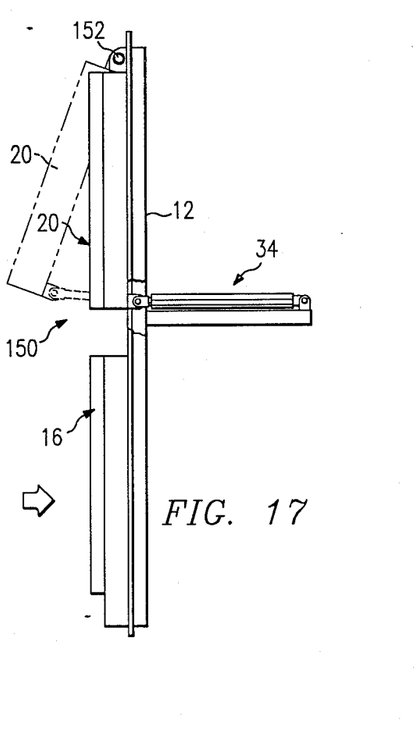
FIG. 17 is a side view of a moisture separator forming a second embodiment of the present invention with a blow-out panel pivoting to the open position in a direction opposite the air flow.
Figure 18:
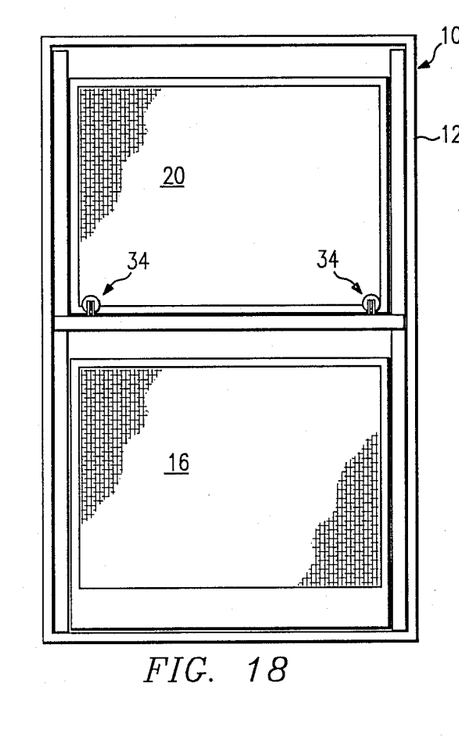
FIG. 18 is a front view of the moisture separator of FIG. 17.

FIG. 16 illustrates the anti-icing circuit of the moisture separator 10. When anti-icing switch 90 is positioned for operation, power is provided from power line 132 to line 134 containing a thermostatic switch 136. Switch 136 closes at a predetermined environmental temperature, such as 40° F., to activate a three-phase relay 138. Three-phase relay 138, in turn, provides three-phase power through lines 140, 142 and 144 to resistance type heat trace in the blow-in panel seals 21 sealing between the panels and frame, cylinders 34, 50 and 80 and moisture drain tanks in the frame to prevent icing. The heat trace is preferably self-limiting in temperature, usually not to exceed 250° F. Also, the thermostatic switch closing temperature is preferably adjustable to suit specific environments.

With reference now to FIGS. 17–24, a moisture separator 150 forming a second embodiment of the present invention is illustrated. Many components of moisture separator 150 are identical to those of moisture separator 10 and are identified by the same reference numeral. However, in moisture separator 150, the panels 18 and 20 are pivoted at their upper end to pivot about an axis 152 from the closed position outward against the direction of air flow to the open position, preferably through an angle of about 30°. The cylinders 34 operate between frame 12 and the lower edge of the panels. An advantage to the design of moisture separator 150 arises if debris, such as ice, is knocked off of or dislodged from panels 18 and 20 when in the opened position. With moisture separator 10, such dislodged material would fall into the air passage leading to the power plant. In contrast, the outward position of the panels in the moisture separator 150 would induce such material to fall exterior the passage and reduce the likelihood of the material entering the power plant.

Figure 19:
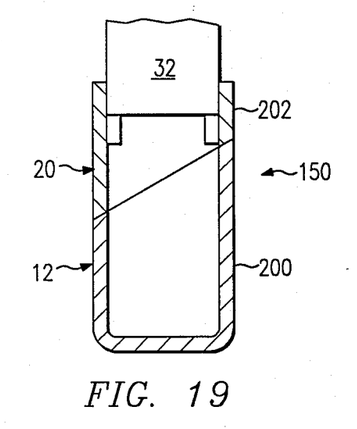
FIG. 19 is a cross-sectional view of a portion of the blow-in panel in the moisture separator of FIG. 17 illustrating the box drain.

FIG. 19 illustrates one drain configuration for moisture separator 150. A portion of frame 12 forms a drain channel 200. At the lower end of the vane elements 32 on panels 18 and 20, a portion 202 is formed. The channel 200 and portion 202 have mating surfaces cut on an angle 30° from horizontal which contact when the panels 18 and 20 are closed. Moisture and debris separated from the air flow fall through vane elements 32, past portion 202 and into the drain channel 200. Channel 200 has a passage along its length to drain the channel through the frame for disposal.

Figure 20:
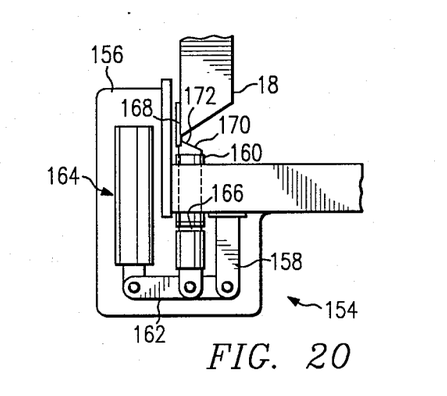
FIG. 20 illustrates the latching mechanism for latching the blow-in panel of the moisture separator of FIG. 17 in the opened position.
Figure 21:
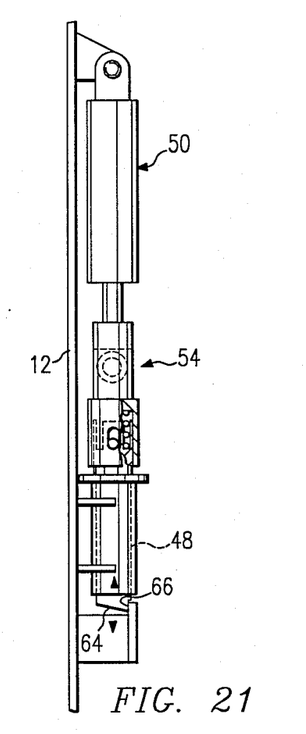
FIG. 21 illustrates the detail of the latching mechanism to hold the blow-in panel of FIG. 17 in the closed position.

FIG. 20 illustrates a modified latch mechanism 154 to hold the panels 18 and 20 in the open position. Bracket 156 extends outwardly from the frame 12 to mount a fulcrum bar 158 and guide 160. A lever 162 is pivoted at one end to the fulcrum bar 158. An air cylinder 164 is pivoted at its base to the bracket 156 with its piston pivoted to the other end of the lever 162. Intermediate the ends of the lever, a plunger 166 is pivoted thereto and slides within guide 160. The cylinder 164 is provided with an internal spring to urge the plunger 166 upward as seen in FIG. 20. As the panel moves to the open position, catch 168 on the panel will move up the ramp 170 of the plunger until the catch is secured within notch 172 of the plunger. The mechanism can release the panel by providing air under pressure to cylinder 164 to move the plunger 166 downward, releasing catch 168.

The latch mechanism 174 employed to hold panels 18 and 20 in the closed position (see FIG. 21) within moisture separator 150 is in most regards identical to latch mechanism 36, but is adapted to the outward motion of the panels.

Figure 22A:
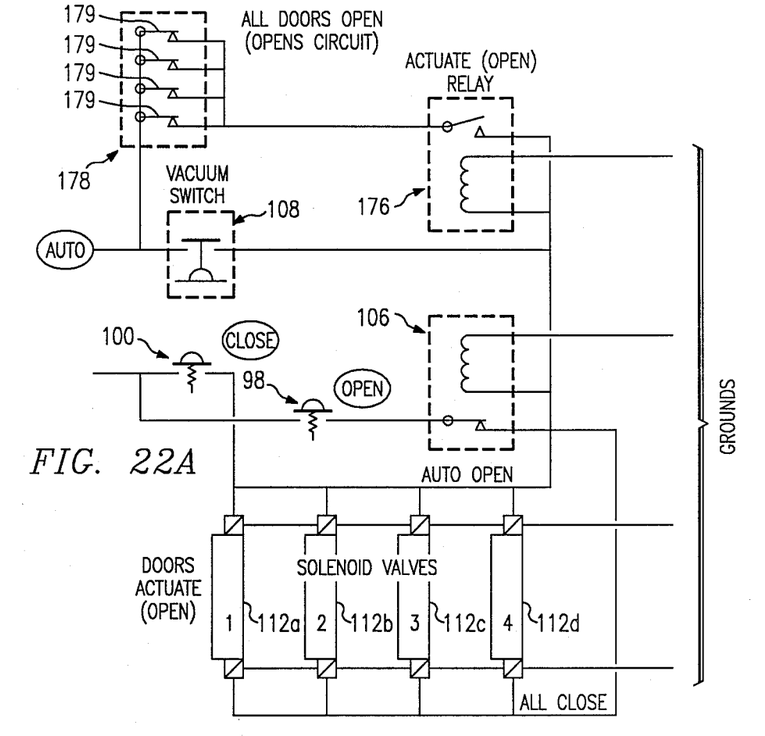
FIGS. 22A and 22B the schematic of the door actuation circuit for the moisture separator of FIG. 17.
Figure 22B:
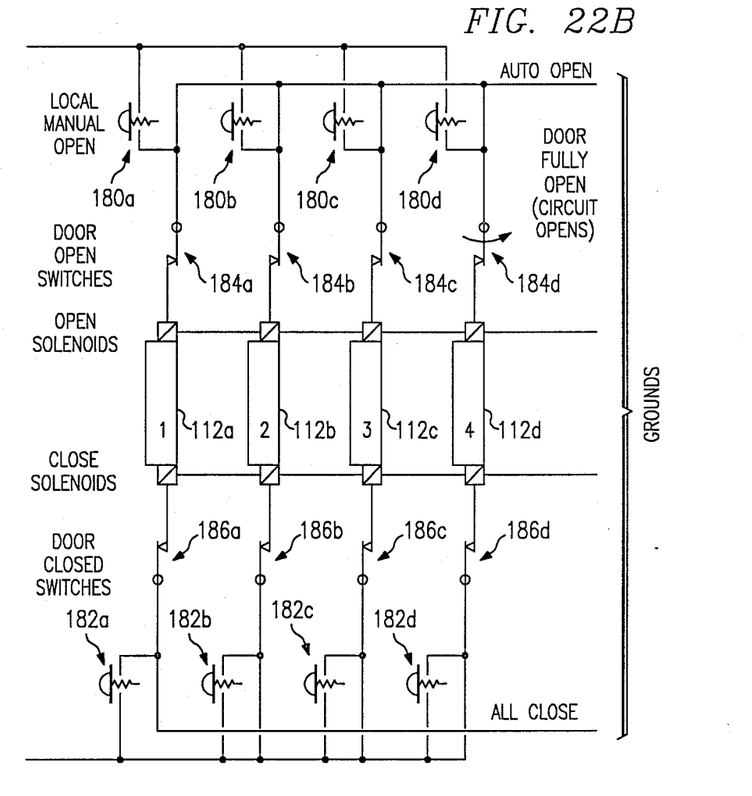

The operating circuit of moisture separator 150 is similar to that for moisture separator 10, as illustrated in FIGS. 22A AND 22B. The circuit illustrated in FIGS. 22A and 22B is capable of operating solenoid valves 112a, 112b, 112c, and 112d for four separate panels with a single vacuum sensing switch 108. Added to the circuit of FIGS. 22A and 22B is an actuate relay 176 which connects the solenoid valves to the power source through a circuit 178 formed by proximity switches 179 at each panel connected in parallel. As each panel is opened, the associated proximity switch will open. Only when all panels are open, and all switches 179 are open, will power cease being delivered to the solenoid 112 to ensure all the panels will be fully opened during an opening sequence, despite the possible opening of the vacuum switch 108 by the pressure increase as the panels begin to open.

The circuit of FIGS. 22A and 22B also provides for local manual actuation of each panel separately through activation of individual open switches 180a, b, c and d or activation of individual door closed switches 182a, b, c or d. When all four panels are closed, relay operating switches 184a, b, c and d open to isolate the switches 180 from their respective solenoid. When all panels are closed, a relay opens switches 186a, b, c and d to separate switches 182 from their respective solenoids. Mechanisms 154 and 174 can be manually released as well.

Figure 23:
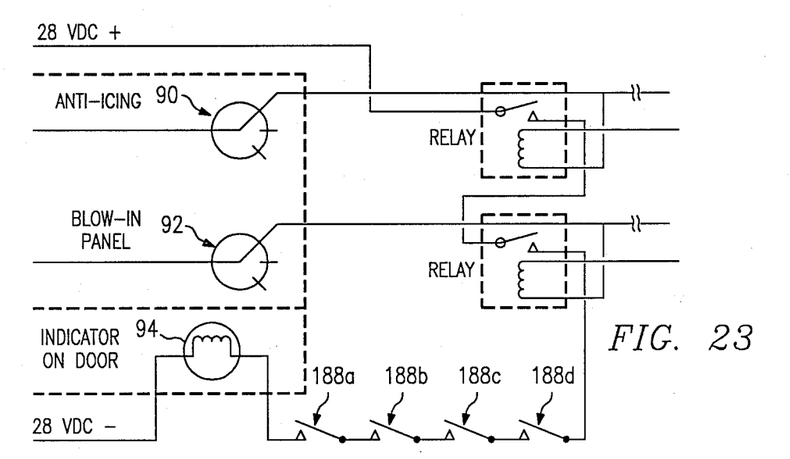
FIG. 23 is a schematic of the panel closed indication circuit for the moisture separator of FIGURE 17.
Figure 24:
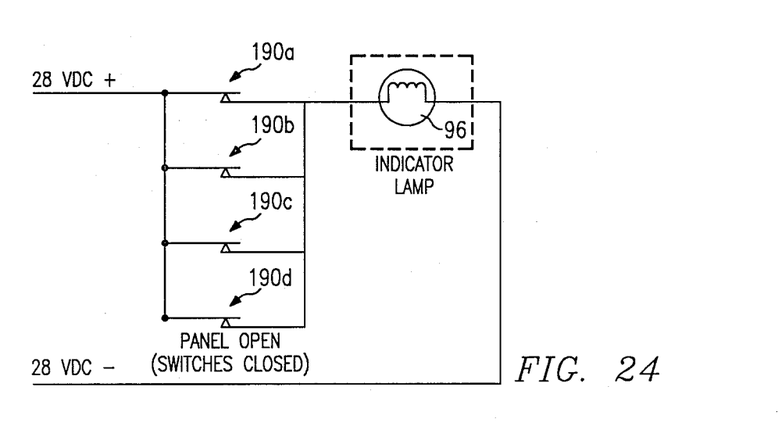
FIG. 24 is the panel open indication circuit for the moisture separator of FIG. 17.

FIGS. 23 and 24 illustrate the indicator light operating functions for the four panel circuit. The closed indication light 94 is only activated when all four panels are closed, as represented by the closed condition of four proximity switches 188a, b, c, and d in series add when both the switch 90 and switch 92 are in automatic mode. However, when any panel is open, as indicated by a proximity switch 190a, b c, or d associated with each panel, the indicator lamp 96 is lit.

Figures 25, 26:
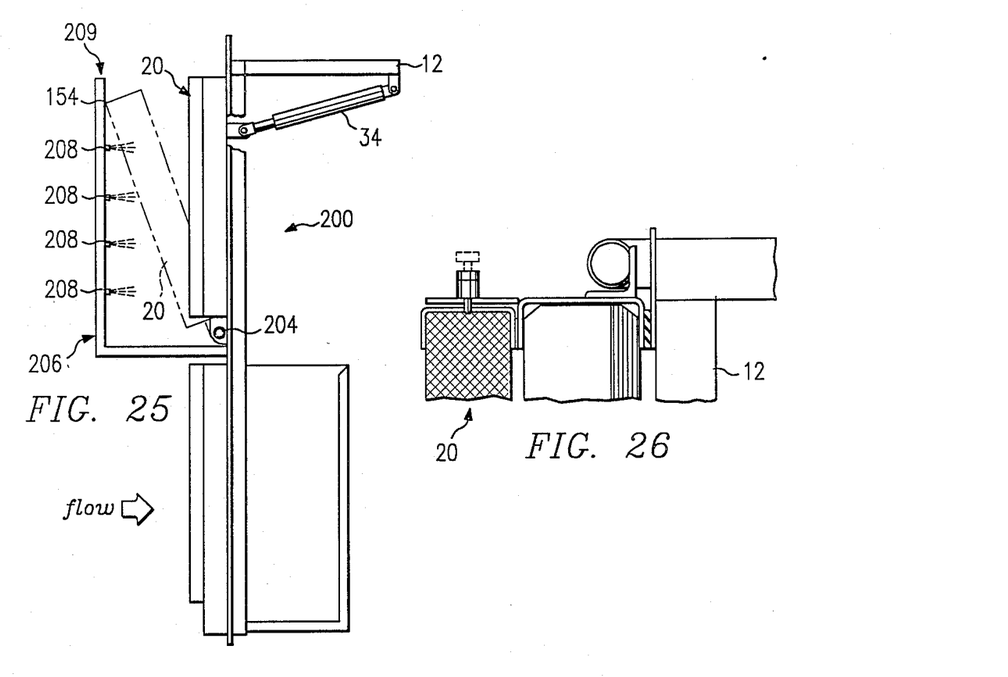
FIG. 25 is a side view of a moisture separator forming a third embodiment of the present invention.
FIG. 26 is a detail of the moisture separator of claim 25.
Figure 27:
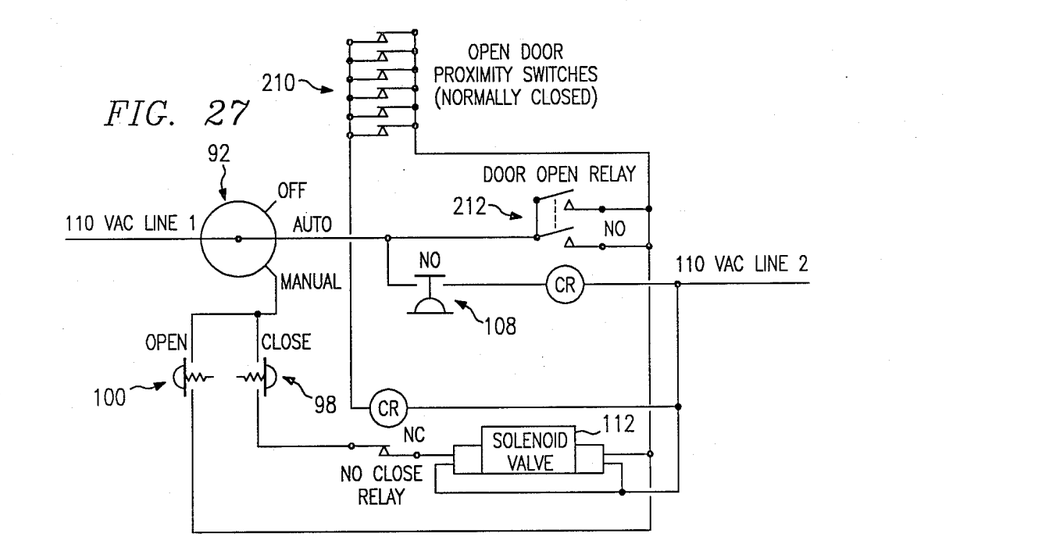
FIG. 27 is the schematic of the door actuation circuit of the moisture separator of FIG. 25.

FIGS. 25-27 illustrate a moisture separator 200 forming a third embodiment of the present invention. In this embodiment, many elements remain identical to those previously discussed with respect to moisture separator 10 and 150. However, the panels 18 and 20 pivot about an axis 204 along their lower edge and the panels pivot from the closed position outward to the open position against the air flow direction, preferably through an angle of about 15°. An anti-icing manifold 206 extends outward against the air flow direction from the frame 12 and vertically upward along the entire length of the panels, with spray nozzles 208 distributed at uniform distances along the vertical height of the manifold. De-icing fluid under pressure can be provided to the manifold 206 and sprayed on to the panels for de-icing with nozzles 208. The upper end 209 of manifold 206 also is provided with latch mechanism 154 to hold the panel in the open position. Thus, manifold 206 acts in a dual function manner to provide de-icing spray and also hold the panel open.

FIG. 27 illustrates the control circuit for the moisture separator 200 using six blow-in panels and a single solenoid valve 112 to operate all six panels and is substantially identical to the circuits described above. The circuit of FIG. 27 does include a set of normally closed open door proximity switches 210 and a door open relay 212. Switches 210 will maintain power to the solenoid 112 until all proximity switches open, indicating all six panels are opened and latched.

While several embodiments of the invention have been illustrated in the accompanying drawings and described in the foregoing Detailed Description, it will be understood that the invention is not limited to the embodiments disclosed, but is capable of numerous rearrangements, modifications and substitutions of parts and elements without departing from the scope and spirit of the invention.

I claim:

1. An apparatus for filtering air entering a flow passage, comprising:
   a frame surrounding an opening into the flow passage;
   a panel mounted to said frame for pivotal motion between a closed position and an open position, the panel including means for filtering air passing through the panel, air entering the flow passage passing through the panel when the panel is in the closed position, air being permitted to pass through the frame and around the panel when the panel is in the opened position;
   opening means for pivoting the panel from the closed to the opened position;
   closing means for pivoting the panel from the open to the closed position; and
   means for latching the panel in the closed position, said latching means including a latch mechanism having a plunger movable between a first position latching the panel in the closed position and a second position for permitting the panel to move from the closed position, a spring for urging the plunger into the first position, a cylinder for moving the plunger to the second position upon entry of a pressurized fluid into the cylinder, and a manual override assembly operatively connecting the cylinder and plunger for manually moving the plunger to the second position independent of the cylinder operation.

2. The apparatus of claim 1 further comprising second latching means for latching the panel in the opened position, said second latching means including a latch mechanism having a stop to limit the motion of the panel to the opened position, a catch pivotally mounted to the frame having a ramp surface and a notch, said panel having a locking pin, and a spring mounted between the frame and catch, the pin on the panel contacting the ramp surface on the frame as the panel moves to the opened position to pivot the catch against the spring force until the pin is received in the notch to lock the panel in the opened position against the stop.

3. The apparatus of claim 1 wherein the panel is mounted to pivot from the closed position to the opened position in a direction opposite the air flow direction.

4. The apparatus of claim 1 further including means for sensing the air pressure downstream of the apparatus and for activating said opening means when the pressure falls below a predetermined level indicating blockage of air flow through the panel.

5. An apparatus for filtering air entering a flow passage, comprising:
   a frame surrounding an opening into the flow passage;
   a panel mounted to said frame for pivotal motion between a closed position and an open position, the panel including means for filtering air passing through the panel, air entering the flow passage passing through the panel when the panel is in the closed position, air being permitted to pass through the frame and around the panel when the panel is in the opened position;

opening means for pivoting the panel from the closed to the opened position;

closing means for pivoting the panel from the open to the closed position;

means for latching the panel in each position; and a manifold mounted to the frame an extending along the panel for providing de-icing fluid to the panel, said de-icing manifold further having latching means for latching the panel to the manifold in the opened position.

6. An apparatus for filtering air entering a flow passage, comprising:

a frame surrounding an opening into the flow passage;

a panel mounted to said frame for pivotal motion between a closed position and an opened position, the panel including means for filtering air passing through the panel, air entering the flow passage passing through the panel when the panel is in the closed position, air being permitted to pass through the frame and around the panel when the panel is in the opened position;

at least one double-acting air cylinder operable between said frame and said panel for powering the door from the closed position to the opened position and powering the door from the opened position to the closed position;

a first latching means for latching the panel in the closed position, said first latching means including an air cylinder, providing pressurized air to said air cylinder unlatching said first latching means;

second latching means for latching the panel in the opened position, said second latching means including an air cylinder, providing pressurized air to said air cylinder unlatching said second latching means;

a de-icing manifold extending from said frame along said panel or spraying a de-icing fluid on to the panel, said second latching means being mounted on said manifold to secure the panel in the opened position.

7. The apparatus of claim 6 wherein said panel pivots from the closed position to the opened position in the direction opposite the air flow direction.

* * * * *